United States Patent
Rausch et al.

(10) Patent No.: US 10,760,635 B2
(45) Date of Patent: Sep. 1, 2020

(54) TORSION SPRING ASSEMBLY, CAMSHAFT PHASER AND BELT OR CHAIN TIGHTENER THEREWITH

(71) Applicant: Scherdel Innotec Forschungs-und Entwicklungs-GmbH, Marktredwitz (DE)

(72) Inventors: Thomas Rausch, Weißdorf (DE); Georg Hannig, Marktredwitz (DE); Christoph Angermann, Thiersheim (DE)

(73) Assignee: Scherdel Innotec Forschungs-Und Entwicklungs GmbH, Marktredwitz (DE)

( * ) Notice: Subject to any disclaimer, the term of this patent is extended or adjusted under 35 U.S.C. 154(b) by 0 days.

(21) Appl. No.: 16/304,756

(22) PCT Filed: May 26, 2017

(86) PCT No.: PCT/EP2017/062788
§ 371 (c)(1),
(2) Date: Nov. 27, 2018

(87) PCT Pub. No.: WO2017/203041
PCT Pub. Date: Nov. 30, 2017

(65) Prior Publication Data
US 2019/0277363 A1    Sep. 12, 2019

(30) Foreign Application Priority Data

May 27, 2016 (DE) .................. 10 2016 109 783

(51) Int. Cl.
*F01L 1/34* (2006.01)
*F16F 3/06* (2006.01)
(Continued)

(52) U.S. Cl.
CPC ............. *F16F 3/06* (2013.01); *F01L 1/00* (2013.01); *F01L 1/024* (2013.01); *F01L 1/3442* (2013.01);
(Continued)

(58) Field of Classification Search
CPC . F01L 1/3442; F01L 1/024; F01L 1/46; F01L 1/00; F01L 2001/34483;
(Continued)

(56) References Cited

U.S. PATENT DOCUMENTS 5,464,197 A    11/1995   Ecclesfield
6,220,586 B1 *  4/2001   Pavlin ................... B21F 35/003
                                                        267/155

(Continued)

*Primary Examiner* — Zelalem Eshete
(74) *Attorney, Agent, or Firm* — Getz Balich LLC (57) ABSTRACT

A torsion spring assembly according to the invention includes a torsion spring having a cylindrical spring body of wound spring wire and with a plurality of torsion spring windings, and having first and second torsion spring ends for taking up forces in a direction of rotation, and a damping spring abutting the torsion spring on the inner side and having a cylindrical spring body of wound spring wire and with a plurality of damping spring windings, and having first and second damping spring wire ends, wherein the damping spring windings have their outer sides extending partially into the space formed between two respectively adjacent torsion spring windings and abutting in particular rounded, round or beveled inner abutment areas of respectively adjacent torsion spring windings with substantially radially outwardly directed bias.

15 Claims, 8 Drawing Sheets

(51) Int. Cl.
*F01L 1/344* (2006.01)
*F16F 1/02* (2006.01)
*F16F 1/04* (2006.01)
*F16H 7/12* (2006.01)
*F01L 1/02* (2006.01)
*F01L 1/46* (2006.01)
*F01L 1/00* (2006.01)
*F16H 7/08* (2006.01)

(52) U.S. Cl.
CPC ............... *F01L 1/46* (2013.01); *F16F 1/025* (2013.01); *F16F 1/042* (2013.01); *F16H 7/1281* (2013.01); F01L 2001/34483 (2013.01); F16F 2224/0208 (2013.01); F16F 2234/02 (2013.01); F16F 2236/08 (2013.01); F16F 2236/085 (2013.01); F16H 2007/081 (2013.01)

(58) Field of Classification Search
CPC .... F16F 1/042; F16F 3/06; F16F 1/025; F16F 2224/0208; F16F 2234/02; F16F 2236/085; F16F 2236/08; F16H 7/1281; F16H 2007/081
USPC ...................... 123/90.15, 90.17, 90.65, 90.67
See application file for complete search history.

(56) References Cited

U.S. PATENT DOCUMENTS 10,309,270 B2 * 6/2019 Boese ................... F01L 1/3442
123/90.17
2013/0233113 A1 9/2013 Saitoh

* cited by examiner

TORSION SPRING ASSEMBLY, CAMSHAFT PHASER AND BELT OR CHAIN TIGHTENER THEREWITH

This application is entitled to the benefit of, and incorporates by reference essential subject matter disclosed in PCT Application No. PCT/EP2017/062788 filed on May 26, 2017, which claims priority to German Application No. 10 2016 109 783.7 filed May 27, 2016.

BACKGROUND OF THE INVENTION

1. Technical Field

The present invention relates to a torsion spring assembly as well as a cam phaser and a belt or chain tensioner provided with a torsion spring assembly according to the invention.

2. Background Information

There are torsion springs known which may be used in a cam phaser or in a belt or chain tensioner in order to hold two movable elements of the cam phaser or two movable elements of the belt or chain tensioner in an initial position, or return the same to the initial position. These torsion springs are disadvantageous in so far as undesired vibrations occur in operation, which partially involve high resonances. This renders such torsion springs unsuitable for some fields of use, in particular for fields of use involving dynamic loads.

It is therefore an object of the present invention to make available a torsion spring with improved spring properties, which is suitable for a larger number of fields of use. In addition, an improved cam phaser as well as an improved belt or chain tensioner provided with such a torsion spring are to be made available.

SUMMARY OF THE INVENTION

This object is met by the subject matter of the independent claims. Advantageous further developments are indicated in the dependent claims.

A torsion spring assembly according to the invention comprises a torsion spring having a cylindrical spring body of wound spring wire and with a plurality of torsion spring windings, and having first and second torsion spring ends for taking up forces in a direction of rotation, as well as a damping spring abutting the torsion spring on the inner side and having a cylindrical spring body of wound spring wire and with a plurality of damping spring windings, and having first and second damping spring wire ends. The damping spring windings have their outer sides extending partially into the space formed between two respectively adjacent torsion spring windings and thus abutting in particular rounded, round or beveled inner abutment areas of respectively adjacent torsion spring windings with substantially radially outwardly directed bias.

In accordance with a first basic idea of the invention, a torsion spring assembly according to the invention is designed such that the damping spring windings are coupled with the torsion spring windings having the damping spring windings respectively abutting thereon. However, this coupling is not completely rigid, but rather takes place via frictional abutment of the damping spring windings on the torsion spring windings. In other words, the damping spring supports the torsion spring.

In accordance with a second basic idea of the invention, friction is caused between the damping spring windings and the respective abutting torsion spring windings upon rotation of the torsion spring wire ends relative to each other.

As a result of these two effects, the torsion spring assembly according to the invention, in comparison with conventional torsion springs, achieves improved spring properties, in particular an improved damping effect, a significant reduction of resonances or resonance peaks, enhanced dimensional stability and operational stability as well as a longer service life and durability.

The partial extension of the damping wire windings into the space formed between two respectively adjacent torsion spring windings may also be referred to as nestling of the damping spring between adjacent torsion spring windings. In this regard, the damping spring urges the torsion spring radially outwardly.

With a torsion spring assembly according to the invention, the resonances occurring due to dynamic excitation of the torsion spring are clearly reduced or avoided completely.

Shear force displacements of individual or several ones of the torsion spring windings, mainly in radial direction, are clearly reduced. This reduces, or even completely avoids, the partly large deformations frequently occurring with conventional torsion springs as well as the associated, undesired stress range values. The torsion spring assembly according to the invention thus achieves higher dimensional stability.

In comparison with a conventional torsion spring, a torsion spring assembly according to the invention allows the outer dimensions of the constructional space to be retained, so that a torsion spring assembly according to the invention may be used in the same applications as well as in the same constructional space available as a conventional torsion spring.

In comparison with a conventional torsion spring, a torsion spring assembly according to the invention involves merely a minor alteration of the spring characteristics. The hysteresis, caused by friction and the spring rate, increases merely slightly in comparison with a conventional torsion spring as well.

The in particular rounded, round or beveled abutment areas of respectively adjacent torsion spring windings are provided with a sufficiently large edge radius in order to allow sufficient guiding for the damping spring, also in case of larger deformation of the torsion spring.

In addition, the inventors have ascertained that, by way of a larger bias of the damping spring in outward direction, the damping effect of the torsion spring assembly in its entirety can be increased.

The damping spring windings may have a smaller wire diameter than the torsion spring windings. In practical use, the damping spring is subject to lower loads than the torsion spring.

The torsion spring assembly according to the invention is suitable for arbitrary dynamic applications, and thus for all applications in which force take-up and/or a cushioning effect in the direction of rotation is to be achieved and in which a dynamic load is present.

A torsion spring assembly according to the invention is particularly advantageous for use in a cam phaser for a motor vehicle engine, or for a belt or chain tensioner for maintaining the tension of a V-belt or ribbed V-belt or a chain in a work unit, such as an internal combustion engine.

The torsion spring assembly according to the invention can be retrofitted rapidly and without any problem in already existing cam phasers or belt or chain tensioners, as the dimension of the torsion spring assembly may correspond to the dimension of a conventional torsion spring.

The spring wire ends of the torsion spring allow for advantageous connection of the torsion spring assembly, in particular in the cam phaser or in the belt or chain tensioner. The spring wire ends of the torsion spring can efficiently take up setting forces, in particular in adjusting the cam phaser or in rotating the belt or chain tensioner.

The torsion spring and the damping spring can be manufactured separately and be united to the torsion spring assembly according to the invention at a later time, either manually or with the aid of a machine. This permits rapid and efficient production.

In accordance with a first embodiment, the respectively adjacent torsion spring windings are coupled with each other via the damping spring winding located therebetween. This results in enhanced spring properties of the torsion spring assembly.

In accordance with a further embodiment, in the non-abutting state of torsion spring and damping spring, the outer diameter of the damping spring is greater than the inner diameter of the torsion spring, in particular greater by a value in the range between 5 and 50% of the wire diameter of the damping spring, so that in the abutting state of torsion spring and damping spring, respectively adjacent torsion spring windings are coupled with each other via the damping spring winding located therebetween. This results in an advantageous bias between torsion spring and damping spring, which leads to further enhanced spring properties, such as e.g. a particularly good damping effect, longer durability as well as enhanced operational stability.

In accordance with a further embodiment, the torsion spring windings each have a substantially rectangular cross-sectional area with rounded or beveled transitions between the radial inner side thereof and the axial lower side thereof, and between the radial inner side thereof and the axial upper side thereof, with these rounded or beveled transitions constituting the abutment areas of the damping spring windings. This permits particularly advantageous coupling of the damping spring windings with the torsion spring windings. This provides for a sufficiently large abutment area between torsion spring windings and damping spring windings, which ensures good guidance of the damping spring windings also in case of deformation of the torsion spring assembly.

According to a further embodiment, the width of the radial upper side and lower side of the cross-sectional area of the spring windings of the torsion spring is greater than the height of the axial inner side and outer side. This provides for a compact construction of the torsion spring assembly with high rigidity in the radial direction.

According to a further embodiment, the torsion spring windings each have a round, oval, elliptic or multi-arc cross-sectional area with round or rounded transitions between the radial inner side thereof and the axial lower side thereof and between the radial inner side thereof and the axial upper side thereof, with these round or rounded transitions constituting the abutment areas of the torsion spring windings. This permits particularly advantageous coupling of the damping spring windings with the torsion spring windings. There is provided a sufficiently large abutment area between torsion spring windings and damping spring windings, thus ensuring good guidance of the damping spring windings also in case of deformation of the torsion spring assembly.

According to a further embodiment, the damping spring windings have a round, oval, elliptic or multi-arc cross-sectional area. This permits particularly advantageous coupling between the torsion spring windings and the damping spring windings. There is provided a sufficiently large abutment area between torsion spring windings and damping spring windings, thus ensuring good guidance of the damping spring windings also in case of deformation of the torsion spring assembly.

According to a further embodiment, the damping spring windings have their outer sides extending into the space formed between two respectively adjacent torsion spring windings across a major part of the inside of the cylindrical spring body of the torsion spring and abutting rounded abutment areas of respectively adjacent torsion spring windings with substantially radially outwardly directed bias. This leads to particularly advantageous spring properties, such as an enhanced damping effect or a significant reduction of resonances or resonance peaks of the torsion spring assembly. For example, the damping spring may have approx. one half to three windings less than the torsion spring.

According to a further embodiment, the cylindrical spring body of the torsion spring and the cylindrical spring body of the damping spring each have the same spring axis, and the cylindrical spring body of the damping spring and the cylindrical spring body of the portion spring are arranged concentrically within each other.

According to a further embodiment, the spring wire ends of the torsion spring are each bent in substantially radially outward direction. This allows for particularly easy connection to the respective connecting sites, such as e.g. to a stator and a rotor of the cam phaser or to an anchor plate and a pivot arm of the belt or chain tensioner.

According to a further embodiment, the damping spring has two spring wire ends that are each bent inwardly. A biasing tool can be applied to these ends in particularly easy manner in order to bias the damping spring and introduce the same into the torsion spring.

According to a further embodiment, the spring windings of the torsion spring and the damping spring have an identical pitch angle, in particular a pitch angle of 1° to 3°.

According to a further embodiment, the spring wire ends of the torsion spring and/or the damping spring are formed without pitch or gradient. This allows for particularly easy connection of the torsion spring assembly.

According to a further embodiment, the torsion spring and/or the damping spring are made of spring steel.

The invention also relates to a torsion spring assembly comprising: a torsion spring having a cylindrical spring body of wound spring wire and with a plurality of torsion spring windings, and having first and second torsion spring ends for taking up forces in a direction of rotation, as well as a damping spring abutting the torsion spring on the outer side and having a cylindrical spring body of wound spring wire and with a plurality of damping spring windings, and having first and second damping spring wire ends. The damping spring windings have their inner sides extending partially into the space formed between two respectively adjacent torsion spring windings, and abutting in particular rounded, round or beveled outer abutment areas of respectively adjacent torsion spring windings with substantially radially inwardly directed bias.

All advantages and embodiments described hereinbefore with regard to the torsion spring assembly with internal damping spring are also applicable to the torsion spring assembly with external damping spring and shall not be described again for avoiding repetitions.

The invention also relates to a cam phaser for a motor vehicle engine. The cam phaser comprises a stator for rigid connection to a cylinder head, which has a substantially cylindrical stator base body including a front wall, a rear wall and a circumferential wall having an inwardly directed inner peripheral surface, as well as two stator webs extending radially inwardly from the inner peripheral surface, a rotor for rigid connection to a camshaft, which is rotatably arranged in the stator and which has a substantially cylindrical base body having an outer peripheral surface and at least two outwardly directed rotor wings, with pressure spaces adapted to be filled or filled with a hydraulic medium being formed between the inner surfaces of the front wall and the rear wall, between the stator webs of the stator and the rotor wings of the rotor as well as between the inner peripheral surface of the stator and the outer peripheral surface of the rotor, as well as a spring receiving space in which a torsion spring assembly of the kind described herein is arranged in such a manner that the first torsion spring wire end is non-rotatably connected to the stator and the second torsion spring wire end is non-rotatably connected to the rotor.

The cam phaser according to the invention is used for varying the control times or valve opening times of inlet and exhaust valves of a motor vehicle engine during operation, thus achieving more efficient fuel consumption while obtaining at the same time higher performance and higher torques.

In operation, the cam phaser may be coupled to the crankshaft of the motor vehicle engine via a belt, a timing chain or spur gears. A belt according to the invention is understood to comprise the elements toothed belt, timing belt, V-belt or combinations of these elements as well.

The torsion spring assembly permits enhanced damping as well as a significant reduction of resonances or resonance peaks between stator and rotor. This leads to longer durability as well as better controllability and adjustability of the cam phaser.

All advantages and embodiments described hereinbefore with regard to the torsion spring assembly are also applicable to the cam phaser and will not be described once more for avoiding repetitions.

Moreover, the invention also relates to a belt or chain tensioner for maintaining the tension of a V-belt, a ribbed V-belt or a chain in a work unit, such as an internal combustion engine. The belt or chain tensioner comprises an anchor plate for connection to the work unit, a pivot arm which is rotatably supported with respect to the anchor plate and which has a belt or chain pulley for guiding the V-belt, the ribbed V-belt or the chain, with said belt or chain pulley being rotatably supported in particular at the end portion of the pivot arm remote from the pivot axis of the pivot arm, as well as a spring receiving space in which a torsion spring assembly of the type described herein is arranged such that the first torsion spring wire end is non-rotatably connected to the anchor plate and the second torsion spring wire end is non-rotatably connected to the pivot arm.

The belt or chain tensioner according to the invention is used for reliably maintaining the tension of the belt or chain. According to the invention, a belt is understood to comprise also the elements toothed belt, timing belt, V-belt or combinations of these elements. By using the torsion spring assembly according to the invention in the belt or chain tensioner, reliable tensioning of the belt or chain is rendered possible, so that slippage of the belt or chain is reliably avoided. Moreover, the belt or chain tensioner renders possible a safe run of the belt or chain along the belt or chain pulley arranged at the pivot arm.

The rotatable connection of the pivot arm to the anchor plate via the torsion spring assembly according to the invention permits easy application and correct, automatic tensioning of the belt or chain as well as safe operation of the belt or chain tensioner.

The pivot arm may be supported via a ball bearing, a roller bearing, a plain bearing or the like. This ensures easy pivoting of the pivot arm with respect to the anchor plate.

All advantages and embodiments described hereinbefore with reference to the torsion spring assembly are also applicable to the belt or chain tensioner and will not be described again for avoiding repetitions.

BRIEF DESCRIPTION OF THE DRAWINGS

The invention will be described in more detail in the following by way of embodiments illustrated in the accompanying drawings, in which.

DETAILED DESCRIPTION OF THE INVENTION

Figure 1:
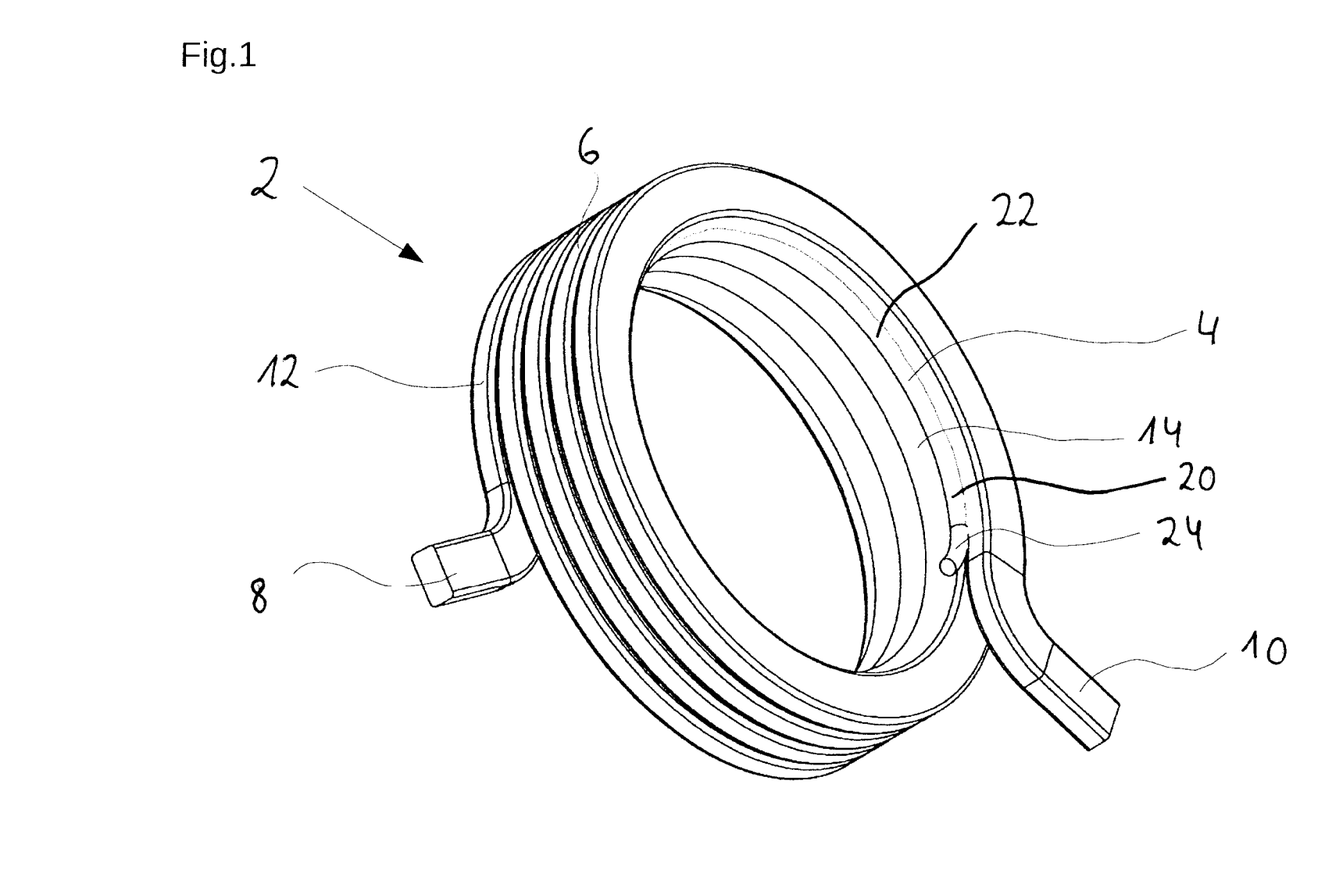
FIG. 1 shows a perspective view, as seen obliquely from above, of a torsion spring assembly comprising a torsion spring and an internal damping spring according to an embodiment of the present invention.

FIG. 1 shows a perspective view, as seen obliquely from above, of a torsion spring assembly 2 comprising a torsion spring 4 and an internal damping spring 20. The torsion spring 4 of wound spring wire comprises torsion spring windings 6 forming a cylindrical spring body extending about a central axis or spring axis. The torsion spring 4 in exemplary manner comprises four torsion spring windings 6 as well as a first torsion spring wire end 8 and a second torsion spring wire end 10. The torsion spring 4, of course, may also have a larger or lesser number of torsion spring windings 6. The torsion spring 4 is designed to receive forces acting thereon via its torsion spring wire ends 8 and 10 in the direction of rotation.

The torsion spring windings 6 have a radial inner side 12 with an inner diameter and a radial outer side 14 with an outer diameter, with the inner diameter and the outer diameter being different from each other and being adapted to be matched to the particular application. The torsion spring wire ends 8, 10 extend radially outwardly, preferably at approx. right angles, from the spring body of the torsion spring 4.

The damping spring 20, made of a wound spring wire as well, comprises damping spring windings 22 which also form a cylindrical spring body extending about the same central axis or spring axis as the torsion spring 4. The damping spring 20 illustrated here comprises three damping spring windings 22 in exemplary manner. It is of course also possible for the damping spring 22 to have a larger or lesser number of windings 22, with the damping spring 20 in particular having 1 to 3 windings less than the torsion spring 4. The damping spring 20 comprises first and second damping spring wire ends 24 and 26 extending radially a certain distance into the interior of the cylindrical spring body. Optionally, the spring ends may also be directed radially outwardly and thus be used on one side as anti-rotation device.

The cylindrical spring body of the torsion spring 4 and the cylindrical spring body of the damping spring 20 are arranged concentrically within each other.

The damping spring 20 abuts the torsion spring 4 on the inner side. The damping spring windings 22 have their outer sides extending partially into the space 28 formed between two adjacent torsion spring windings 6 each. The damping spring windings 22 abut inner abutment areas of respectively adjacent torsion spring windings 6 with radially outwardly directed bias. The abutment areas on the side of the torsion spring windings are constituted by the rounded or beveled transitions from the radial inner side 12 to the axial lower side 18 and the axial upper side 16 of the respective torsion spring windings 6. These abutment areas on the side of the torsion spring windings may be rounded, round or beveled.

In a further embodiment, not illustrated, the damping spring abuts the torsion spring externally, and the damping spring windings have their inner sides extending partially into the external space formed between two adjacent torsion spring windings each.

In a non-abutting state of torsion spring 4 and damping spring 20, the damping spring 20 has a larger outer diameter than the inner diameter of the torsion spring 4. In particular, the outer diameter of the damping spring 20 may be larger by a value which is in the range between 5% and 50% of the diameter of the damping spring windings 22. In the abutting state, this permits the damping spring windings 22 to abut inner abutment areas of respectively adjacent torsion spring windings 6 with radially outwardly directed bias, and allows that respectively adjacent torsion spring windings 6 are coupled with each other via the damping spring winding 22 located therebetween.

The torsion spring windings 6 are arranged in parallel or in axially aligned manner with respect to each other, with adjacent spring windings being arranged at an axial spacing from each other, which corresponds to a height of 1% to 50% of the height of one torsion spring winding 6.

The damping spring windings 22 extend across a major part of the height of the inside of the cylindrical spring body of the torsion spring 4 to respective end abutment sections which, as seen in the direction of rotation, are each located in front of the torsion spring wire ends 8 and 10 and from which the first and second damping spring wire ends 24 and 26 are bent inwardly.

The torsion spring windings 6 and the damping spring windings 22 have an identical pitch angle, which is in a range from 1° and 10°, in particular in a range from 1° to 3°.

Figure 2:
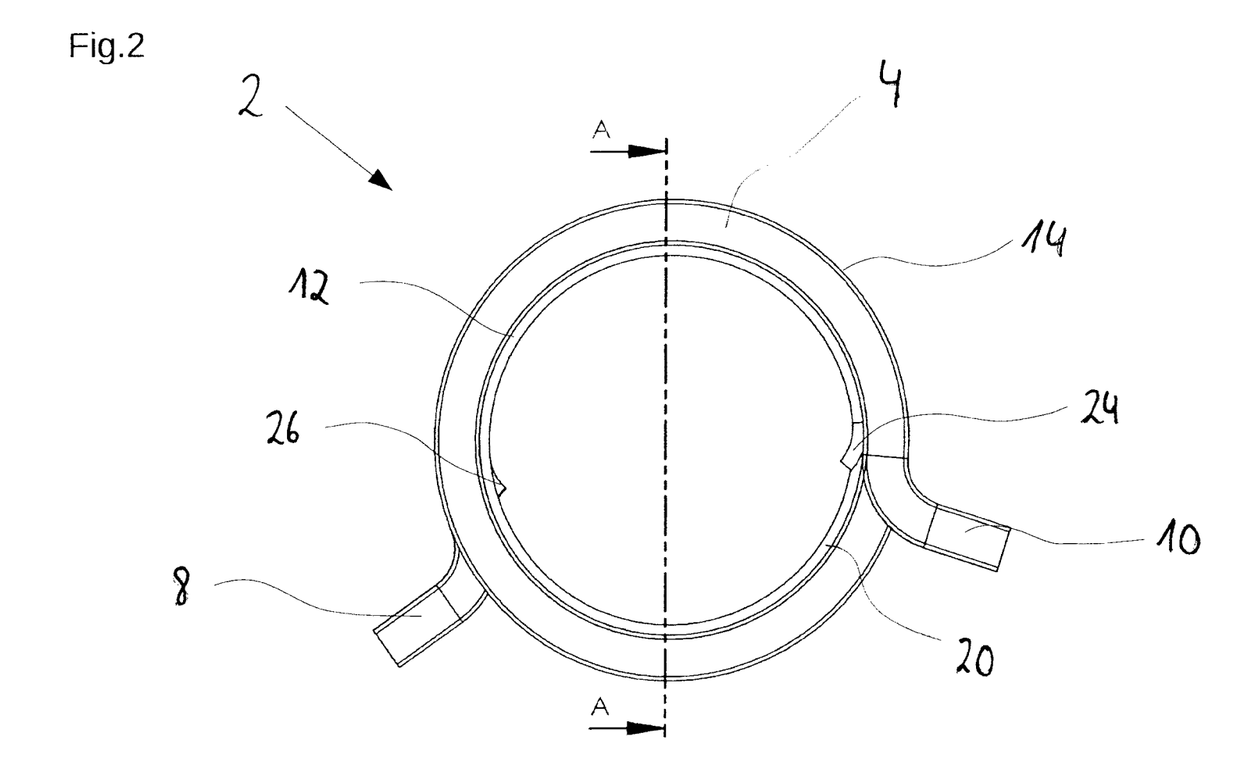
FIG. 2 shows a plan view of the torsion spring assembly of FIG. 1.

FIG. 2 shows a plan view of the torsion spring assembly 2 along the central axis or spring axis. The view clearly shows the torsion spring 4 along with the internally abutting damping spring 22.

The damping spring wire ends 24, 26 in exemplary manner extend at an angle from 5° to 75°, in particular at an angle from 10° to 45°, radially into the inner space formed by the cylindrical spring body.

In the embodiment that is not illustrated, in which the damping spring is arranged externally of the torsion spring, the damping spring wire ends extend radially outwardly in the aforementioned angle range.

The torsion spring wire ends 8, 10 are each bent radially outwardly from an end of a lower and upper torsion spring winding 6, respectively. The torsion spring wire ends 8, 10 may be bent radially outwardly at an angle between 80° and 100°, in particular at an angle of 90°, starting from the end of the respective torsion spring winding 6 where these ends begin. The torsion spring wire ends 8, 10, in the embodiment illustrated, are arranged at an angle of approx. 130° to 160°, in particular of 140° to 150°, with respect to each other as measured in the direction of rotation. Of course, the torsion spring wire ends 8, 10 may also be arranged at a different angle with respect to each other.

Figure 3:
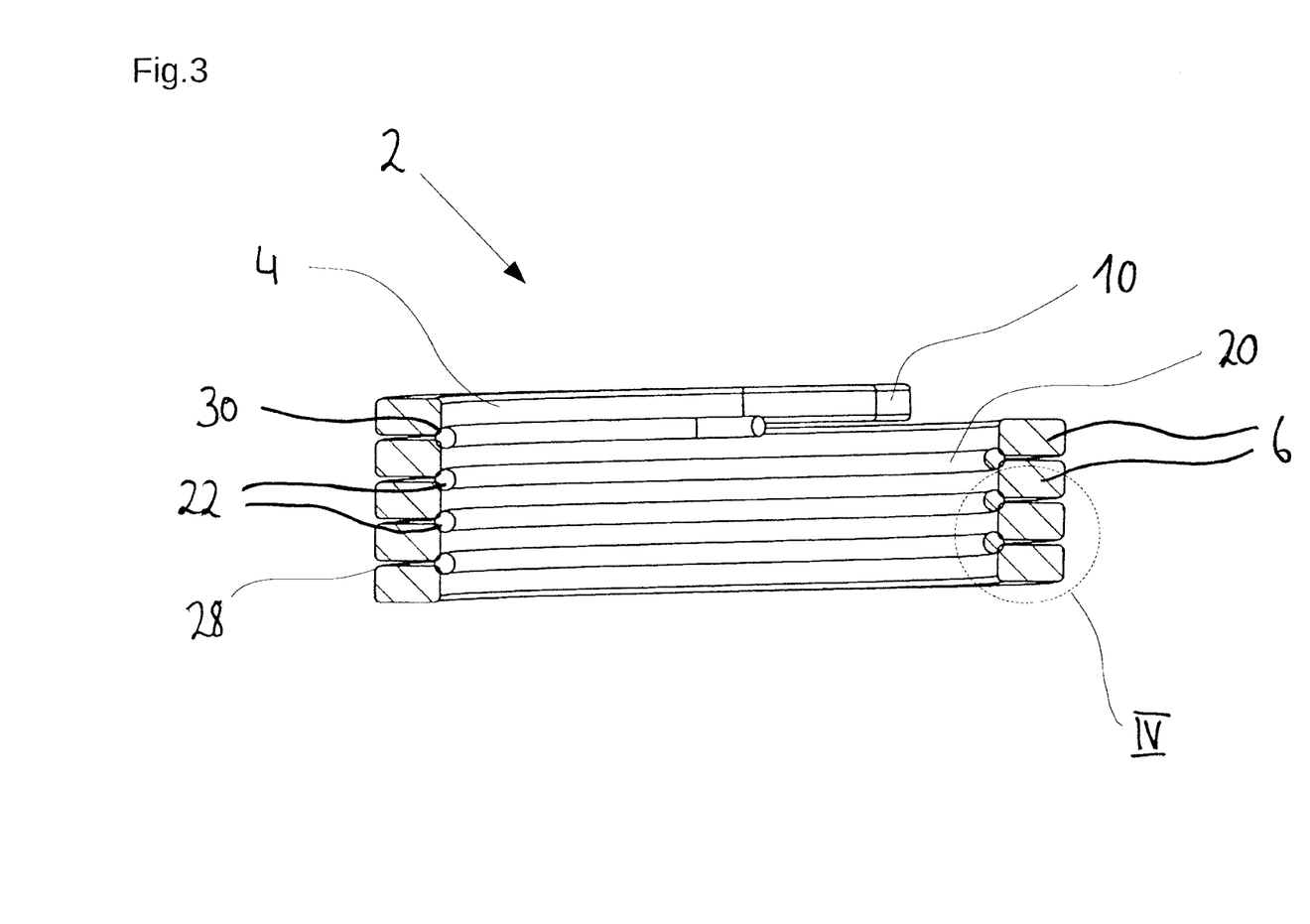
FIG. 3 shows a cross-sectional view along a cross-sectional plane A-A of the torsion spring assembly of FIGS. 1 and 2, said plane extending through the spring axis.

FIG. 3 illustrates a cross-sectional view along a cross-sectional plane A-A of the torsion spring assembly 2, which extends through the spring axis. The torsion spring windings 6 each having a substantially rectangular cross-sectional area and the damping spring windings 22 having a round cross-sectional area, are clearly visible.

The damping spring windings 22 abut the rounded inner abutment areas on the side of the torsion spring windings with outwardly directed bias, said abutment areas bearing numeral 30 herein. The abutment areas 30 on the side of the torsion spring windings, which are constituted by the rounded or beveled transitions from the radial inner side 12 to the axial lower side 18 and to the axial upper side 16 of the respective torsion spring windings 6, are clearly visible in FIG. 3.

The torsion spring wire end 10 beginning at the upper torsion spring winding 6 is clearly visible in FIG. 2.

The torsion spring wire ends 8, 10 may be formed without pitch or gradient. This holds also for the damping spring wire ends 24, 26.

FIG. 3 clearly shows that the width of the axial upper side 16 and the axial lower side 18 of the torsion spring windings 22 is greater than the height of the radial inner side 12 and the radial outer side 14 of the torsion spring windings 22. This achieves a particularly compact construction of the torsion spring assembly 2.

The torsion spring windings 4 may have a round, oval, elliptic or multi-arc cross-sectional area in other embodiments not illustrated here.

The damping spring windings 22 may have a round, oval, elliptic or multi-arc cross-sectional area in other embodiments not illustrated here.

Figure 4:
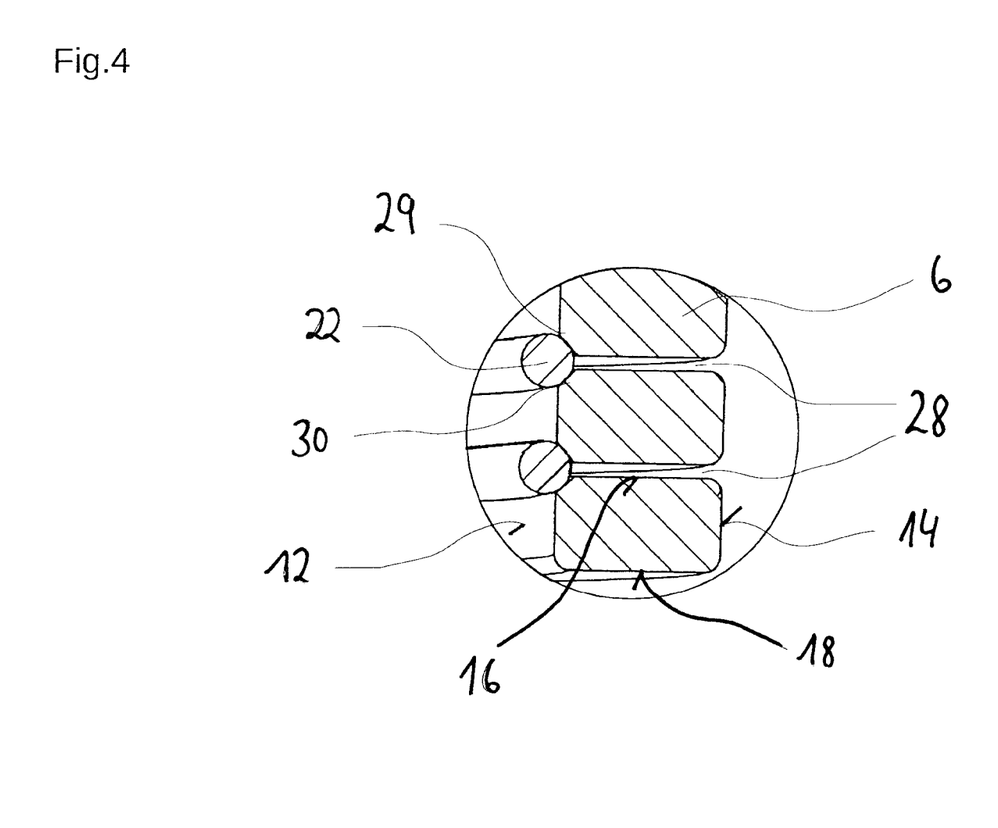
FIG. 4 shows an enlarged detailed view of three torsion spring windings and two damping spring windings of the cross-sectional view of FIG. 3.

FIG. 4 shows an enlarged detailed view of three torsion spring windings 6 and two damping spring windings 22 of the cross-sectional view of FIG. 3. The space 28 between two adjacent torsion spring winding 6 each is clearly visible. Also clearly visible are the rounded or beveled inner abutment areas 30 on the side of the torsion spring windings, on which the damping spring windings 22 abut with bias.

Figure 5:
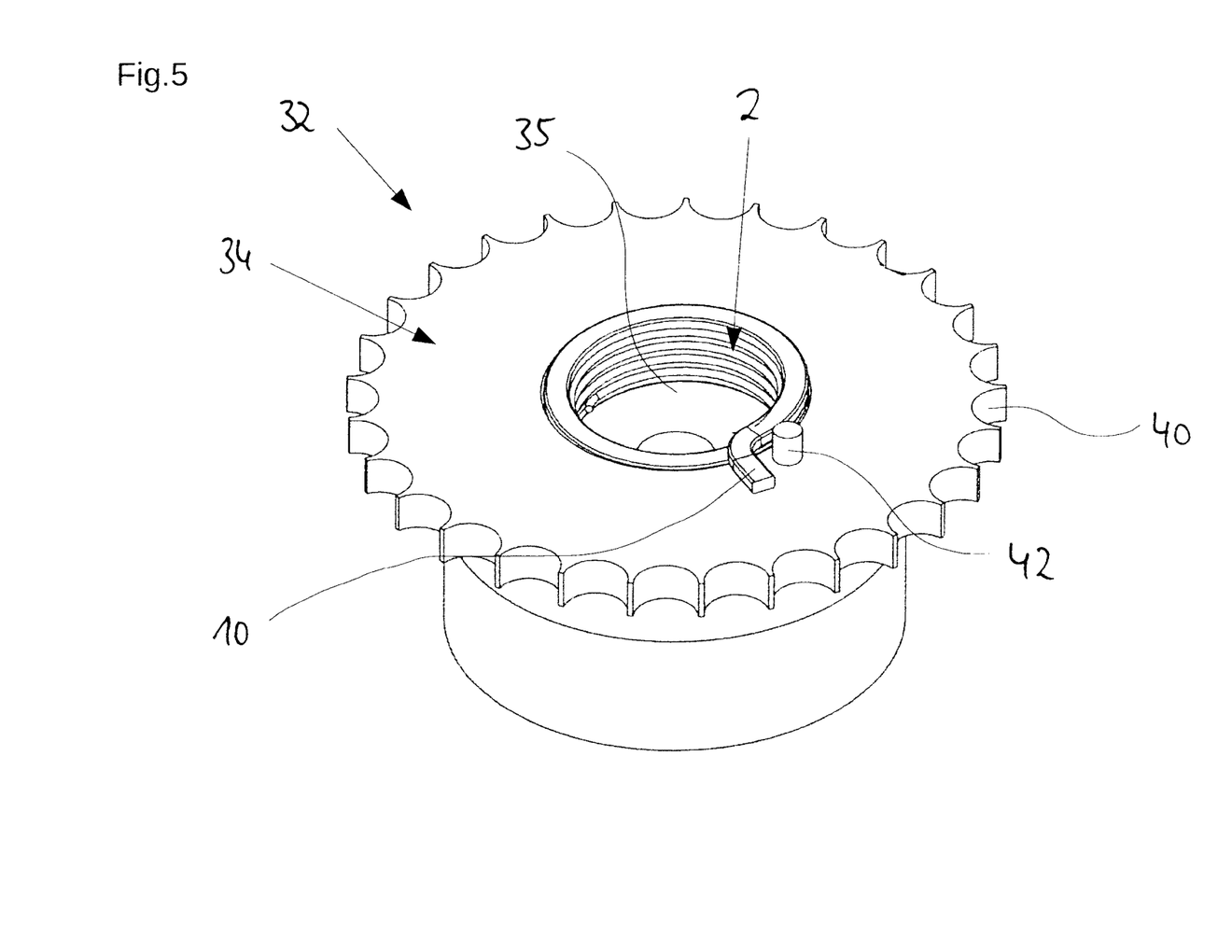
FIG. 5 shows a perspective view of a cam phaser, clearly showing a stator and the torsion spring assembly of FIGS. 1 to 4 arranged in the stator.

FIG. 5 shows a perspective view of a cam phaser 32, permitting a clear view of a stator 34 and the torsion spring assembly 2 arranged within the stator 34.

Figure 6:
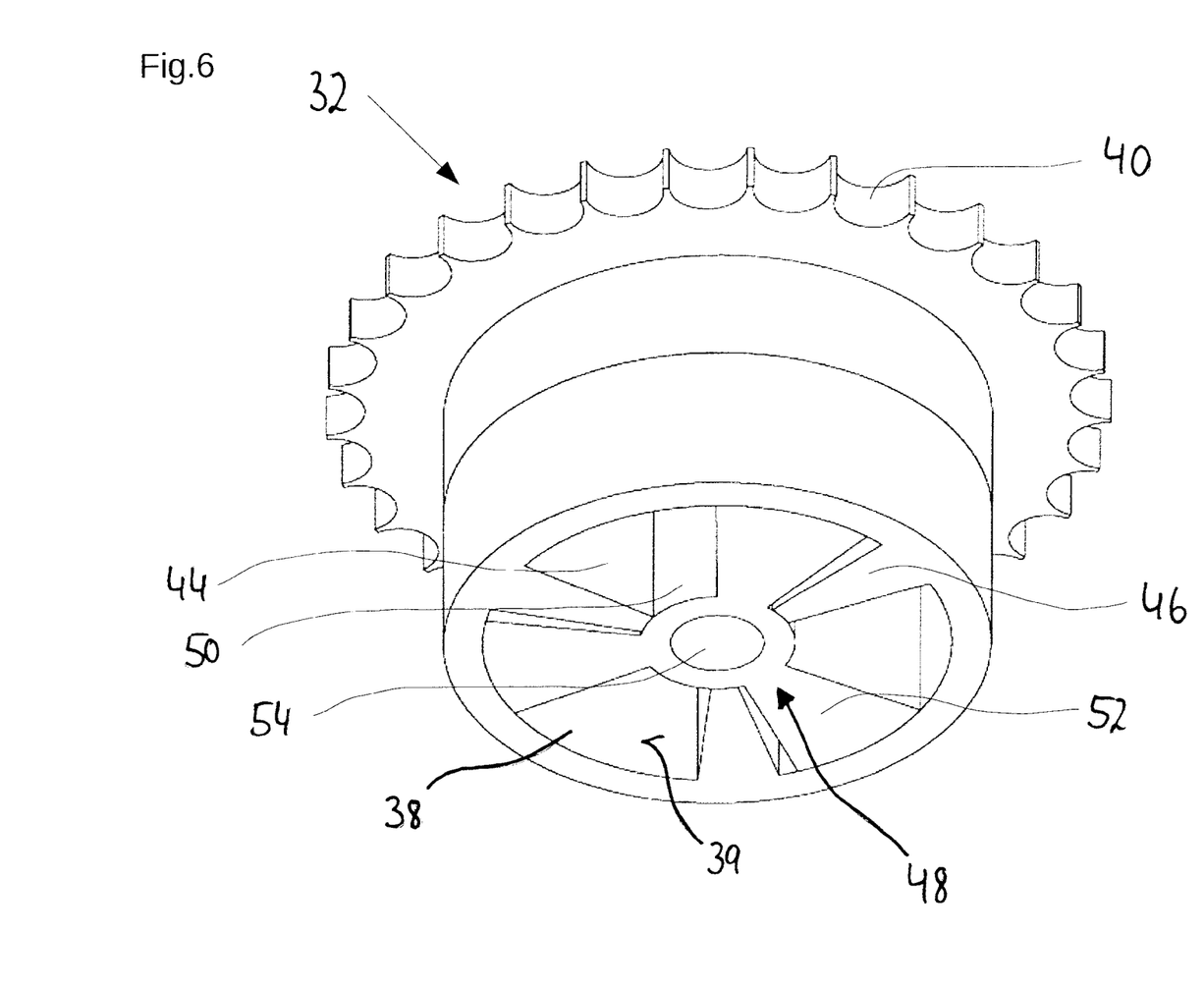
FIG. 6 shows a perspective view of the cam phaser of FIG. 5, which clearly shows a rotor.

FIG. 6 shows a perspective view of the cam phaser 32, permitting a clear view of a rotor 48 arranged within the stator 34.

The cam phaser 32 comprises a stator 34 and a rotor 48 rotatably arranged in the stator 32.

On the outer circumference of the stator 34 in axial direction remote from the rotor 48, there is formed a toothed driving member connecting portion 40 for connecting the cam phaser 32 to a drive unit.

The stator 34 may be connected to a cylinder head, not illustrated. The stator 34 comprises a substantially cylindrical stator base body 36 and a front wall, not illustrated and forming an upper wall in FIG. 6, a rear wall, not illustrated and forming a lower wall in FIG. 6, which is conceivable as closing the rotor 48 from below, as well as a circumferential wall 38.

The circumferential wall 38 comprises an inwardly directed inner peripheral surface 39 from which at least one, in the exemplary embodiment three, stator webs 46 extend radially inwardly. The portion located in circumferential direction between the stator webs 48 defines a rotor wing receiving space 44. In the present embodiment, the stator 34 comprises three stator webs 46 in exemplary manner. The stator webs 46 extend as far as a rotor outer peripheral surface 50 of rotor 48.

The rotor 48 comprises a substantially cylindrical base body having the rotor outer peripheral surface 50. From this rotor outer peripheral surface 50, there extends at least one rotor wing 52, in the embodiment three rotor wings 52 in exemplary manner, in radially outward direction. The rotor wings 52 extend as far as the inner peripheral surface 39 of the stator 34. The rotor 48 has a camshaft mounting opening 54 arranged centrally therein, in which a camshaft for a motor vehicle engine can be fixedly mounted.

Between the inner surfaces of the front wall and the rear wall, between the stator webs 46 of stator 34 and the rotor wings 52 of rotor 48 as well as between the inner peripheral surface 39 of stator 34 and the outer peripheral surface 50 of rotor 48, there are formed pressure spaces 56 which can be filled or are filled with a hydraulic medium.

The stator 34 and the rotor 48 define a cylindrical spring receiving space 35, having the torsion spring assembly 2 arranged therein. The cylindrical spring receiving space 35 is clearly visible in FIG. 5. It extends from the upper face of the stator 34 downwardly towards the rotor 48 and has a height corresponding approx. to the block dimensions of the torsion spring assembly 2, and an inner diameter corresponding approx. to the outer diameter of the torsion spring windings 6 of the torsion spring assembly 2.

The torsion spring assembly 2 is arranged in the spring receiving space 35 of the cam phaser 32 such that the torsion spring windings 6 abut the peripheral surface of the spring receiving space 35, or are arranged at a slight radial spacing from the same, such that the first torsion spring wire end 8 is non-rotatably connected to stator 34 and the second torsion spring wire end 10 is non-rotatably connected to rotor 48.

The torsion spring wire end 8 abuts a supporting pin 42 of stator 34, which takes up a resetting force of the torsion spring assembly 2. As shown in FIG. 5, the supporting pin 42 may axially project from the face of stator 34 in upward direction. The opposite torsion spring wire end, which is not visible in FIGS. 5 and 6, is connected to rotor 48.

A torsion spring assembly 2 arranged in this manner permits exact control or regulation of the adjustment angle of the camshaft. Moreover, use of the torsion spring assembly 2 can ensure more sufficient fuel consumption of the motor vehicle engine. Due to the mechanical adjustability of the torsion spring assembly 2, particularly simple resetting of the rotor 48 in the cam phaser 32 is rendered possible.

Figure 7:
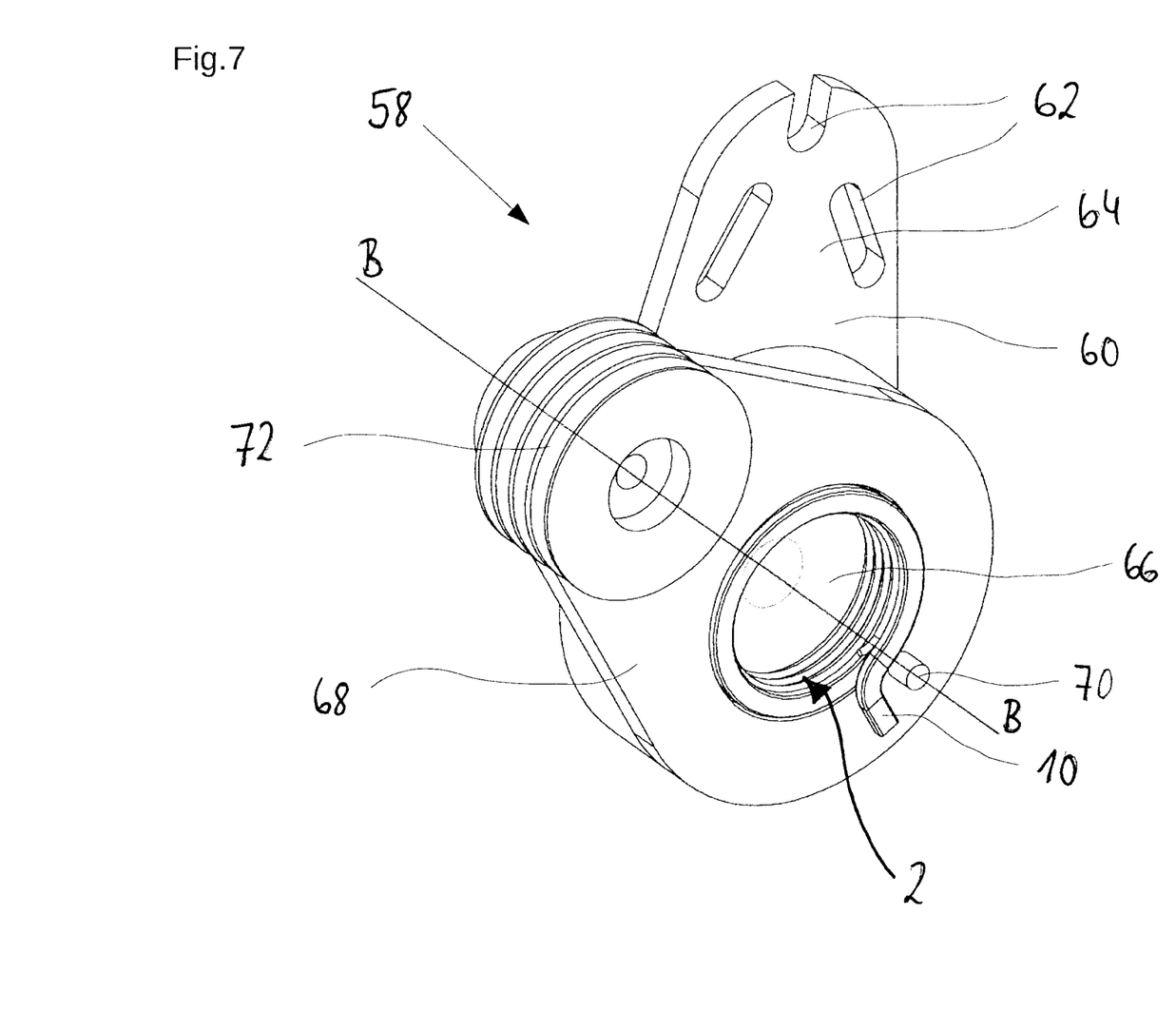
FIG. 7 shows a perspective view of a belt or chain tensioner comprising an anchor plate, a pivot arm rotatably supported thereon and having a belt or chain pulley, along with the torsion spring assembly of FIGS. 1 to 4 connecting the anchor plate to the pivot arm.

FIG. 7 shows a perspective view of a belt or chain tensioner 58 for maintaining the tension of a V-belt, a ribbed V-belt or a chain in a work unit.

Figure 8:
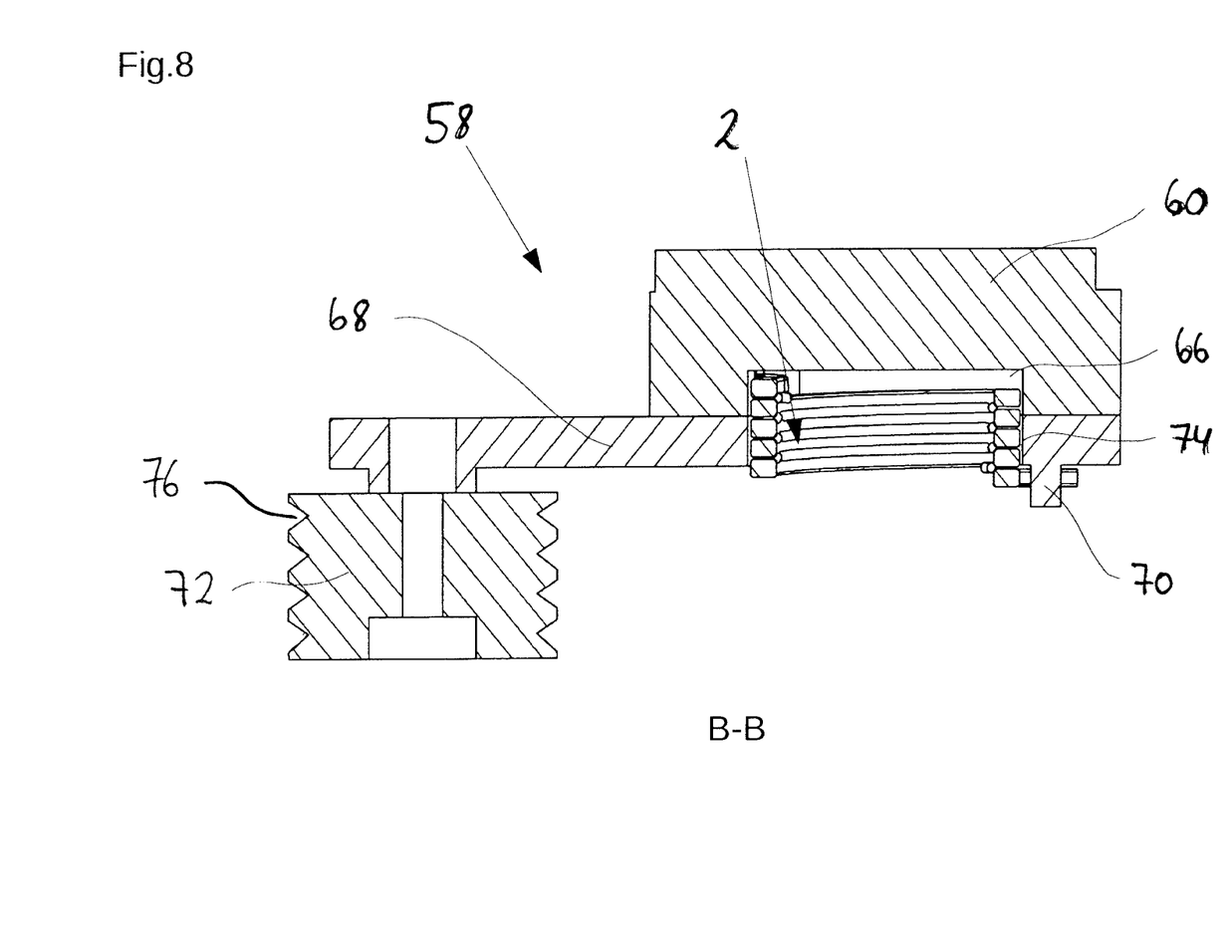
FIG. 8 shows a cross-sectional view along a cross-sectional plane B-B extending through the longitudinal axis of the pivot arm of FIG. 7.

FIG. 8 shows a cross-sectional view of the belt or chain tensioner 58 along a cross-sectional plane B-B, intersecting the pivot arm 68 in the direction of the longitudinal axis thereof.

The belt or chain tensioner 58 comprises an anchor plate 60 for a preferably fixed connection to the work unit. The anchor plate 60 has mounting portions 62 provided therein which are formed as recesses, which in the example illustrated are present in a number of three. Of course, there may also be a larger or lesser number of mounting portions provided in the anchor plate.

In addition, the belt or chain tensioner 58 has a pivot arm 68 rotatably supported with respect to the anchor plate 60, said pivot arm 68 comprising a belt or chain pulley 72 for guiding the belt or chain, which is rotatably supported in particular at the end portion of the pivot arm 68 remote from the pivot axis of pivot arm 68.

The pivot arm 68 is arranged preferably on an upper side 64 of anchor plate 60. It is of course also possible that the spring receiving space 66 is formed by the anchor plate 60 only or by the pivot arm 68 only.

The torsion spring assembly 2 permits simple and reliable biasing of the pivot arm 68. This has the effect that the rotatably supported belt or chain pulley 72 is permanently in contact with the V-belt, the ribbed V-belt or the chain and keeps the same under tension. Slippage of the V-belt, the ribbed V-belt or the chain is thus avoided in particularly reliable manner.

The anchor plate 60 and the pivot arm 68 define a cylindrical spring receiving space 66 having the torsion spring assembly 2 arranged therein.

FIG. 8 clearly shows that a cylindrical recess in the anchor plate 60 as well as an aligned cylindrical recess in the pivot arm 68 together form the cylindrical spring receiving space 66 having the torsion spring assembly 2 arranged therein.

The cylindrical spring receiving space 66 has a height corresponding approx. to the block dimensions of the torsion spring assembly 2, and an inner diameter corresponding approx. to the outer diameter of the torsion spring windings 6 of the torsion spring assembly 2.

The torsion spring assembly 2 is arranged in the spring receiving space 66 such that the torsion spring windings 6 abut the peripheral surface of the spring receiving space 66 or are arranged at a slight radial spacing from the same, that the first torsion spring wire end 8 is non-rotatably connected to the anchor plate 60 and that the second torsion spring wire end 10 is non-rotatably connected to the pivot arm 68 via a supporting pin 70.

The torsion spring wire end 8 abuts the supporting pin 42 of pivot arm 68, which takes up a resetting force of the torsion spring assembly 2. As shown in FIGS. 7 and 8, the supporting pin 68 may project beside the spring receiving space 74 from the face of the pivot arm 68 in axially upward direction. The opposite torsion spring wire end, not visible in FIGS. 7 and 8, is connected to anchor plate 60.

At the opposite end of the pivot arm 68, there is provided a bore, where the belt or chain pulley 72 is rotatably supported using suitable fastening means, with the belt or chain pulley 72 being arranged on the side of the pivot arm 68 facing away from the anchor plate 60. With a corresponding design of the belt or chain pulley 72, it is of course also possible to arrange the belt or chain pulley 72 on the side facing towards the anchor plate 60. This permits a particularly compact form of construction for a belt or chain tensioner.

The belt or chain pulley 72 in the present embodiment has five notches 76 extending circumferentially around the belt or chain pulley 72 in order to ensure exact guiding of the V-belt, the ribbed V-belt or the chain. It is of course also possible to arrange a larger or lesser number of notches 76 in the belt or chain pulley 72.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A torsion spring assembly, comprising:
    a torsion spring having a cylindrical spring body of wound spring wire and with a plurality of torsion spring windings, and having first and second torsion spring ends for taking up forces in a direction of rotation; and
    a damping spring abutting the torsion spring on an inner side of the torsion spring and having a cylindrical spring body of wound spring wire and with a plurality of damping spring windings, and having first and second damping spring wire ends;
    wherein at least one of the plurality of damping spring windings has its outer sides extending partially into a space formed between two respectively adjacent torsion spring windings of the plurality of torsion spring windings; and
    characterized in that
    the at least one damping spring windings abuts an inner abutment area of the two respectively adjacent torsion spring windings with substantially radially outwardly directed bias;
    the plurality of damping spring windings have a smaller wire diameter than the torsion spring windings;
    the damping spring has one to three windings less than the torsion spring; and
    the plurality of damping spring windings extend across a major part of a height of the cylindrical spring body of the torsion spring, from a first end abutment section located in front of the first torsion spring wire end, as seen in the direction of rotation, to a second end abutment section located in front of the second torsion spring wire end, as seen in the direction of rotation.

2. The torsion spring assembly of claim 1, wherein the two respectively adjacent torsion spring windings are coupled with each other via one of the plurality of damping spring windings located therebetween.

3. The torsion spring assembly of claim 1, wherein, in a non-abutting state of torsion spring and damping spring, an outer diameter of the damping spring is greater than an inner diameter of the torsion spring, so that in an abutting state of the torsion spring and the damping spring, respectively adjacent torsion spring windings of the plurality of torsion spring windings are coupled with each other via one of the plurality of damping spring windings located therebetween.

4. The torsion spring assembly of claim 1, wherein each of the plurality of torsion spring windings has a substantially rectangular cross-sectional area with rounded or beveled transitions between a radial inner side thereof and an axial lower side thereof and between the radial inner side thereof and an axial upper side thereof, with these rounded or beveled transitions constituting abutment areas of the plurality of damping spring windings; and/or
    wherein a width of an axial upper side and lower side of the cross-sectional area of the torsion spring windings of the torsion spring is greater than a height of the radial inner side and a radial outer side.

5. The torsion spring assembly of claim 1, wherein each of the torsion spring windings has a round, oval, elliptic or multi-arc cross-sectional area with round or rounded transitions between a radial inner side thereof and an axial lower side thereof and between the radial inner side thereof and an axial upper side thereof, with these round or rounded transitions constituting abutment areas of the plurality of torsion spring windings.

6. The torsion spring assembly of claim 1, wherein the plurality of damping spring windings have a round, oval, elliptic or multi-arc cross-sectional area.

7. The torsion spring assembly of claim 1, wherein each of the plurality of damping spring windings has an outer side; and
    wherein one of the plurality of damping spring windings has its outer side extending into the space formed between two respectively adjacent torsion spring windings of the plurality of torsion spring windings across a major part of the inner side of the torsion spring, and abutting rounded abutment areas of respectively adjacent torsion spring windings of the plurality of torsion spring windings with substantially radially outwardly directed bias.

8. The torsion spring assembly of claim 1, wherein the torsion spring wire ends of the torsion spring are each bent in substantially radially outward direction; and/or
    wherein the damping spring comprises two spring wire ends that are each bent inwardly.

9. The use of the torsion spring assembly according to claim 1 for enhancing the damping effect and for reducing resonances or resonance peaks in a dynamic application.

10. A cam phaser for a motor vehicle engine, comprising:
    a stator for rigid connection to a cylinder head, said stator comprising a substantially cylindrical stator base body including a front wall, a rear wall and a circumferential wall having an inwardly directed inner peripheral surface, as well as at least two stator webs extending radially inwardly from the inner peripheral surface;
    a rotor for rigid connection to a camshaft, said rotor being rotatably arranged in the stator and including a substantially cylindrical base body having an outer peripheral surface and at least two outwardly directed rotor wings;
    wherein pressure spaces adapted to be filled or filled with a hydraulic medium are formed between an inner surface of the front wall and an inner surface of the rear wall, between the at least two stator webs of the stator and the rotor wings of the rotor as well as between the inner peripheral surface of the stator and the outer peripheral surface of the rotor; and
    a spring receiving space having a torsion spring assembly according to claim 1 arranged therein such that the first torsion spring wire end is non-rotatably connected to the stator and the second torsion spring wire end is non-rotatably connected to the rotor.

11. A belt or chain tensioner for maintaining the tension of a V-belt, a ribbed V-belt or a chain in a work unit, comprising:
  an anchor plate for connection to the work unit;
  a pivot arm which is rotatably supported with respect to the anchor plate and which has a belt pulley or a chain pulley for guiding the V-belt, the ribbed V-belt or the chain, with said belt pulley or said chain pulley being rotatably supported at an end portion of the pivot arm remote from a pivot axis of the pivot arm;
  a spring receiving space in which a torsion spring assembly according to claim 1 is arranged such that the first torsion spring wire end is non-rotatably connected to the anchor plate and the second torsion spring wire end is non-rotatably connected to the pivot arm.

12. The torsion spring assembly of claim 1, wherein each torsion spring winding has a substantially rectangular cross-sectional geometry defined by an axial lower side, an axial upper side, a radial inner side, and a radial outer side;
  wherein a first inner abutment area extends between the radial inner side and the axial upper side, and a second inner abutment area extends between the radial inner side and the axial lower side; and
  wherein the inner abutment area of each of the respectively adjacent torsion spring windings are defined by the first inner abutment area and the second inner abutment area of the respectively adjacent torsion spring windings; and
  wherein the axial upper side and lower axial side have a radially extending width, and the radial inner side and the radial outer side have an axially extending height, and the width is greater than the height.

13. A torsion spring assembly, comprising:
  a torsion spring (TS) having a TS cylindrical spring body of wound spring wire having a first wire diameter, and with a plurality of torsion spring windings, and having first and second torsion spring ends configured to take up forces in a direction of rotation; and
  a damping spring (DS) abutting the torsion spring on an inner side of the torsion spring, and having a DS cylindrical spring body of wound spring wire having a second wire diameter, and with a plurality of damping spring windings, and having first and second damping spring wire ends, and each of the plurality of damping spring windings has an outer side;
  wherein the second wire diameter is smaller than the first wire diameter; and
  wherein at least one of the plurality of damping spring windings has its outer side extending partially into a space formed between two respectively adjacent torsion spring windings of the plurality of torsion spring windings, and abuts an inner abutment area of each of the respectively adjacent torsion spring windings with substantially radially outwardly directed bias; and
  wherein the plurality of torsion spring windings of the torsion spring has at least one more winding than the plurality of damping spring windings; and
  wherein the plurality of damping spring windings extend across a major part of a height of the cylindrical spring body of the torsion spring, from a first end abutment section located in front of the first torsion spring wire end, as seen in the direction of rotation, to a second end abutment section located in front of the second torsion spring wire end, as seen in the direction of rotation.

14. The assembly of claim 13, wherein the plurality of torsion spring windings of the torsion spring has up to three more windings than the plurality of damping spring windings.

15. The assembly of claim 13, wherein the torsion spring in a non-abutting state has an inner diameter, and the damping spring in a non-abutting state has an outer diameter, and the outer diameter is greater than the inner diameter, so that in an abutting state the outer diameter of the damping spring is biased against the inner diameter of the torsion spring, and respectively adjacent torsion spring windings of the plurality of torsion spring windings are coupled with each other via one of the plurality of damping spring windings located there between.

* * * * *